United States Patent
Pinnow et al.

[11] 3,722,981
[45] Mar. 27, 1973

[54] LOW MELTING POINT OPTICAL TRANSMISSION LINE

[75] Inventors: Douglas A. Pinnow, Berkeley Heights; Le Grand Gerard Van Uitert, Morris, both of N.J.

[73] Assignee: Bell Telephone Laboratories, Incorporated, Murray Hill, N.J.

[22] Filed: May 17, 1971

[21] Appl. No.: 143,877

[52] U.S. Cl. ........................ 350/96 WG, 331/94.5
[51] Int. Cl. .................................................. G02b 5/14
[58] Field of Search ...................... 350/96 WG, 177

[56] References Cited

UNITED STATES PATENTS

| 3,355,674 | 11/1967 | Hardy | 350/96 WG X |
| 3,563,630 | 2/1971 | Anderson et al. | 350/96 WG |
| 2,511,224 | 6/1950 | Sun et al. | 350/177 X |
| 3,035,490 | 5/1962 | Tibbetts | 350/177 X |

*Primary Examiner*—John K. Corbin
*Attorney*—R. J. Guenther and Edwin B. Cave

[57] ABSTRACT

Use of material selected from classes of low-melting water-soluble glasses is found to result in low Rayleigh scattering loss. Decreased insertion loss due to this mechanism becomes significant when losses due to other mechanisms have been minimized. Reduction of ultimate insertion loss relative to the more usual insoluble high-melting glasses may justify the additional expense incurred in designing protective systems.

16 Claims, 1 Drawing Figure

PATENTED MAR 27 1973   3,722,981
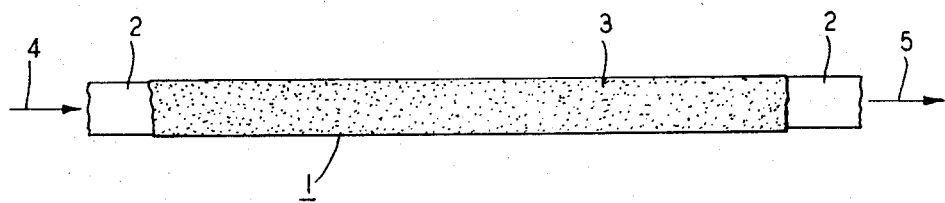
INVENTORS  D.A. PINNOW
L.G. VAN UITERT
BY
George S. Indby
ATTORNEY

LOW MELTING POINT OPTICAL TRANSMISSION LINE

BACKGROUND OF THE INVENTION

1. Field of the Invention

The invention is concerned with glass transmission lines for use in the visible and near-visible spectrum.

2. Description of the Prior Art

The invention of the laser almost immediately prompted interest in the development of broad band communications systems. Progress has been significant. New and more efficient lasers have evolved as have useful circuit elements performing a multitude of functions, e.g., modulation, frequency shifting, isolation, etc. However, it is well known to workers in the field that a significant obstacle toward a light communication system is the development of a suitable low-loss transmission medium. Various approaches have been pursued; some focusing, some not focusing, some utilizing vacuum or gaseous media, some crystalline or glassy. Of these, many workers believe the glass transmission line to be most promising, particularly for intrametropolis and other short-haul use.

Probably the most significant work in glass transmission lines has been concerned with various types of silicate glasses. Such materials are familiar, preparatory techniques are known, and they are possessed of certain obvious practical advantages, e.g., chemical and physical stability. See, for example, Vol. 11, *Glass Technology*, pp. 30–35, April, 1970. According to F. P. Kapron et al., *Applied Physics Letters*, Vol. 17, pp.423–425, Nov. 15, 1970, transmission lines of carefully prepared fused silica have insertion losses of approximately 20 dB per kilometer at a wavelength of 6,238 angstrom units.

Progress of silica-based glass has advanced to so sophisticated a level that inherent characteristics rather than impurities or imperfections may become relevant. It is conceivable that in the near future insertion losses due to scattering centers introduced by impurities and other imperfections may be so reduced that inherent Rayleigh scattering may become consequential. Rayleigh scattering losses are known to vary approximately as the inverse 4th power of the optical wavelength. Insertion losses due to Rayleigh scattering in fused silica are of the order of from 0.7 to 0.9 dB/km at 9,000 angstrom units and from 5 to 6 dB/km at 5,460 angstrom units.

SUMMARY OF THE INVENTION

The invention is premised on the use of relatively low-melting glasses in optical transmission lines. Exemplary materials which desirably melt below about 600° C and preferably below about 300° C are glasses of the nitrate, acetate, and fluoride systems and also boron oxide ($B_2O_3$). Such glasses are generally water soluble and both their manufacture and use are usually complicated by the need to protect these materials even from normal ambient atmosphere. This drawback must be considered as a factor responsible for a lack of interest in such materials up to this time.

Use of low-melting, albeit, water-soluble glasses, or even normally molten glasses, for optical transmission lines is prompted by fundamental study which reveals that a component of Rayleigh scattering increases linearly as does the melting point of the glassy medium (for the purpose of this description, glass melting point is defined as the temperature at which a decreased viscosity of $10^7$ poises is attained).

Examples of water-soluble glasses, in accordance with the invention, are nitrates and acetates of a variety of cations. A typical composition may be a mixed nitrate or acetate of, for example, potassium and calcium. Water-soluble fluoride glasses may be illustrated of mixtures of $BeF_2$ and $LiF_2$.

Aside from water solubility, other characteristics are generally desirable for transmission line use. Compositions, for example, are generally temperature stable and physically durable. From the operational standpoint, refractive indices are generally low thereby minimizing a further source of insertion loss.

BRIEF DESCRIPTION OF THE DRAWING

The FIGURE is a cross-sectional view of a portion of a glass transmission line in accordance with the invention.

DETAILED DESCRIPTION

THE FIGURE

The depicted transmission line section 1 is composed of a glass inner portion 2 of a rigid or nonrigid composition in accordance with the invention, and this, in turn, is contained and/or protected from moisture-containing ambient by a coating or sealed container schematically represented as 3. Radiation introduced by means not shown is depicted by arrow 4 and exiting radiation is depicted as arrow 5. Introduction and extraction means may include elements having appropriately matched or related refractive indices relative to that of medium 2. Either of such means may also include one or more optically polished surfaces. The depicted structure may be supported or may be included on a substrate, for example, as a portion of a printed circuit.

Since Rayleigh scattering losses become more significant as wavelength is decreased, structures of the invention may be of greater interest in the visible spectrum than in the infrared.

At the present time, it is not known what optical wavelength is the best choice for optical communication systems. This depends on a number of factors including the type of sources available and on the total insertion loss of the transmission media.

For the inventive purposes, it is assumed that optical communications will be carried out at sufficiently short wavelength such that Rayleigh scattering represents a substantial fraction of the total optical loss. Use of a visible portion of the spectrum has practical appeal to installers and maintenance people since its use permits direct observation of breaks and other defects in transmission lines. From this standpoint, it is expected that operation of the inventive structures will utilize light of wavelengths of 5,000 A to 7,000 A (as measured in vacuum), and structures designed for such use, therefore, constitute a preferred embodiment. Nevertheless, an embodiment of the invention does contemplate the use of deuterated compounds in which OH bonds are replaced with OD bonds so as to reduce absorption loss in the 9,000 A range. The glass transmission material 2 may actually be composed of an inner and outer region of slightly different chemical composition chosen such that the outer region has a slightly lower (approximately 1 percent) refractive index than that of the inner region and may, therefore, serve as a focusing aid. Properly designed, such a structure may expedite transmission of either coherent or incoherent radiation.

The depicted element is designed primarily for use with monochromatic light. Typical sources for radiation are lasers as well as solid state incoherent sources such as forward biased junction diodes. Transmitted radiation is, in general, modulated so as to contain intelligence. Such modulation may take any of the usual forms, e.g., amplitude, frequency, or phase. Use may also be made of subcarriers, time or frequency multiplexing, etc.

THEORY

The significance of invention derives from the relationship of Rayleigh scattering to melting point. Glasses are nonequilibrium systems and insertion loss due to scattering from the thermally excited phonons is significant. It is to be expected that such losses increase with ambient temperature, and this has been experimentally verified. From the inventive standpoint, the more significant observation is that thermally excited randomized phonons frozen into the glass systems when they become rigid also contribute as a part of the Rayleigh scattering loss (or are absent when the operating temperature is above the melting point). This observation explains why the total Rayleigh scattering loss is reduced for the low-melting materials of the invention.

It is well known that an optical beam exponentially decreases in intensity when traveling through an attenuating medium. Thus, a beam of initial intensity $I_o$ is reduced to intensity I after traveling a distance X. Thus $$I = I_o e^{-\alpha_{tot} X} \qquad (1)$$

where $\alpha_{tot}$ is the total attenuation coefficient which is composed of two parts associated with scattering and absorption $$\alpha_{tot} = \alpha_{scat} + \alpha_{abso} . \qquad (2)$$

The first part is the Rayleigh scattering coefficient. A recent analysis of the Rayleigh scattering loss in optical glass (Pinnow, unpublished) indicates that $\alpha_{scat}$ is proportional to the following material parameters:

$$\alpha_{scat} \sim (n^8 p^2 / \rho V^2)(T+T_g) \qquad (3)$$

where $n$ = index of refraction
$p$ = photoelastic component
$\rho$ = density
$V$ = sound velocity
$T$ = ambient temperature, and
$T_g$ = glass melting temperature.
This analysis is based on an extension of classical light scattering theory (see, for example, I. L. Fabelinskii, *Molecular Scattering of Light*, Plenum Press, New York; 1968) modified by the recent theory of D. A. Pinnow, S. J. Candau, J. T. LaMacchia, and T. A. Litovitz (*Journal of Acoustical Society of America*, Vol. 43, pp. 131–142, January 1968) which is specifically applicable to the glassy state.

The most important parameters in this formula are $n^8$ and $T_g$. The magnitude of $p$ for most liquids and glasses can be approximated by the Lorentz-Lorentz value $$p = (n^2-1)(n^2+2)/3n^4 \qquad (4)$$

which is almost constant and equal to 0.35 for $n$ in the range of 1.5 to 2.5 (for indices of refraction less than 1.5, $p$ is somewhat smaller), see D. A. Pinnow, *IEEE Journal of Quantum Electronics*, Vol. QE-6, pp.223–238, April, 1970). The quantity $\rho V^2$ which appears in the denominator of the Rayleigh scattering formula is equal to the elastic modulus of a material which may vary considerably from one material to the next. However, it is expected that the variations in $n^8$ and $T_g$ will dominate the Rayleigh scattering coefficient. In order to reduce this scattering, materials should be selected with low $n^8(T+T_g)$ values.

COMPOSITION

Glassy materials considered particularly useful for optical transmission lines in accordance with the invention are discussed. These include nitrates, acetates and compositions containing $BeF_2$ as well as $B_2O_3$. Any of the compositions herein may be deuterated with the recognized advantage that infrared absorption associated with OH groupings may be eliminated.

For the purpose of this inventive description, the terminology "water soluble" has reference to compositions having such solubility as to cause sufficient surface erosion of surfaces exposed to ordinary atmospheres to result in significant surface roughening within an ordinary lifetime for the transmission line. For these purposes, materials considered to be at least slightly soluble (in cold water) in accordance with the table starting on p. B–147 of the *Handbook of Chemistry and Physics*, 4th Ed. published by the Chemical Rubber Company, are considered to have this characteristic.

Previous workers have shown that it is possible to prepare certain low melting point glasses in the $KNO_3$—$Ca(NO_3)_2$ and $NaC_2H_3O_2$—$LiC_2H_3O_2$ systems and related compositions.

In *Inorganic Glass Forming Systems*, H. Rawson, Academic Press, New York (1967) and *Journal of the American Ceramic Society*, Vol. 53, p.446 (1970), nitrate and acetate mixtures containing monovalent (1) and/or divalent (2) cations are described. Such glasses containing only monovalent cations may be termed 1–1 glasses and those containing both monovalent and divalent cations may be termed 1–2 glasses. The present work has shown that it is also possible to make suitable glasses using trivalent (3+ cation) nitrates alone, 1–3 nitrates or acetates, 1–2–3 nitrates or acetates, 2–3 nitrates or acetates and 3–4 nitrates as well as many related mixtures. Examples are given.

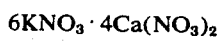
$6KNO_3 \cdot 4Ca(NO_3)_2$

$Y(NO_3)_3$

$LiNO_3 \cdot Gd(NO_3)_3$

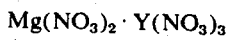
$Mg(NO_3)_2 \cdot Y(NO_3)_3$

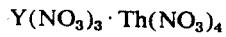
$Y(NO_3)_3 \cdot Th(NO_3)_4$

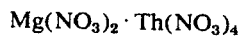
$Mg(NO_3)_2 \cdot Th(NO_3)_4$

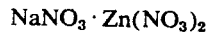
$NaNO_3 \cdot Zn(NO_3)_2$

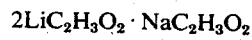
$2LiC_2H_3O_2 \cdot NaC_2H_3O_2$

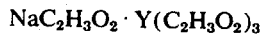
$NaC_2H_3O_2 \cdot Y(C_2H_3O_2)_3$

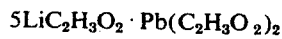
$5LiC_2H_3O_2 \cdot Pb(C_2H_3O_2)_2$

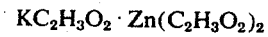
$KC_2H_3O_2 \cdot Zn(C_2H_3O_2)_2$

Mixtures of such compounds may also be employed along with limited amounts of chlorite, sulfate, formate, propionate and similar anions.

There are also alkali metal fluoride — $BeF_2$ mixtures and alkali metal oxide — $B_2O_3$ mixtures which are glass forming. Those with low concentrations of low atomic number alkali metals are preferred for the present application as refractive index is then minimized. The nitrate and acetate glasses have refractive indices comparable to or lower than that of fused silica ($n\sim1.46$) with melting points of less than one-third that of fused silica ($T_g$ greater than 1,400° C). Thus $\alpha_{scat}$ [Eq. (3)] is less for the lower melting materials. $B_2O_3$ has about the same refractive index as fused silica but melts near 450° C. It, therefore, also has a favorable $\alpha_{scat}$. $BeF_2$ melts at about 538° C and has an index $n \sim 1.27$. The low refractive index of $BeF_2$ makes it a useful component for low $\alpha_{scat}$ glass. The favorable properties of such materials result in a decrease in inherent Rayleigh scattering by a factor of two or more as compared with fused silica. Such improvement is considered desirable for the practice of the invention and, in consequence, suitable glassy compositions are defined as those having a melting point of a maximum value of about 600° C.

MATERIAL PREPARATION

Glasses of the type contemplated offer significant processing advantages in that they are readily purified by chemical processing to eliminate contamination.

EXAMPLES

EXAMPLE 1

300 grams of $KNO_3$ and 500 grams of $Ca(NO_3)_2 \cdot 4H_2O$ were dissolved in water and cycled for 4 hours through a filter to remove particulate matter that scatter light. The vessel containing the cycled filtrate was then vented and heated to a temperature of about 90° C to distill out the $H_2O$. When the evolution of $H_2O$ essentially ceased, the melt was raised in temperature to near 300° C for an hour to remove residual water from the fused material, and then was cooled to near 100° C to permit the pulling of fibers.

EXAMPLE 2

100 grams of $Y(NO_3)_3 \cdot 6D_2O$, prepared by solution and precipitation of the hydrate in $D_2O$, was dissolved in $D_2O$ and cycled for 6 hours through a filter. The vessel containing the cycled filtrate was then vented and heated to drive off the $D_2O$. The temperature was raised to near 350° C for an hour and then lowered to permit the pulling of a fiber. The fiber was passed through shellac to provide a protective coating. Not all of the $D_2O$ was removed at the temperature employed (about 90° C). However, higher temperatures may lead to decomposition of the nitrate ion.

EXAMPLE 3

50 grams of boric acid were dissolved in $D_2O$, cycled through a filter for 5 hours, dehydrated, heated under vacuum by slowly raising the temperature to 1,000° C, cooled to near 450° C and pulled as fibers.

EXAMPLE 4

50 grams of $Be(OH)_2$ were dissolved in $D_2O$, cycled through a filter for 3 hours, dehydrated, heated under a flow of HF to form a fluoride, cooled to near 540° C under argon and pulled as fibers.

The fibers pulled in accordance with the examples showed little visible scattering when transmitting 6,328 A wavelength emission from a helium neon laser. The Rayleigh scattering loss was estimated to be about 1 dB/km.

What is claimed is:

1. Transmission line for electromagnetic radiation comprising a glassy member and first and second means for introducing and extracting radiation, respectively, characterized in that said glassy member is a water soluble composition having a melting point of below about 600° C, and in that said line is provided with third means which acts as a substantial barrier to ambient atmospheric ingredients.

2. Transmission line of claim 1 in which said glassy member consists essentially of at least one compound selected from the group consisting of nitrates, acetates, and $BeF_2$.

3. Transmission line of claim 2 in which the said glassy member consists essentially of a mixture of $KNO_3$ and $Ca(NO_3)_2$.

4. Transmission line of claim 2 in which the said glassy member consists essentially of $Y(NO_3)_3$.

5. Transmission line of claim 2 in which the said glassy member consists essentially of a mixture of $MgNO_3$–$Y(NOD3)_3$.

6. Transmission line of claim 2 in which the said glassy member consists essentially of a mixture of $LiNO_3$–$Y(NOC3)_3$.

7. Transmission line of claim 2 in which the said glassy member consists essentially of at least one acetate of a cation selected from the group consisting of lithium and sodium.

8. Transmission line of claim 7 in which said composition is modified by cation substitution in amount of at least 1 weight percent of at least one element selected from the group consisting of Ca, Sr, Ba, Pb, Zn, Cd, Gd, Y, La and Lu.

9. Transmission line of claim 8 in which said composition contains both lithium and sodium as cations, each being present in amount of at least 10 cation percent.

10. Transmission line of claim 9 in which said composition additionally contains cationic yttrium.

11. Transmission line of claim 1 in which said composition is modified by replacement of substantially all OH groupings by OD groupings.

12. Transmission line of claim 1 in which said glassy member consists essentially of $B_2O_3$.

13. Transmission line of claim 1 in which said first means includes at least one optically polished surface.

14. Transmission line of claim 1 in which said second means includes at least one optically polished surface.

15. Transmission line of claim 1 in which said first means includes an index matching material.

16. Transmission line of claim 1 in which said first means includes a laser oscillator.

* * * * *